(12) United States Patent
Miller

(10) Patent No.: US 6,857,846 B2
(45) Date of Patent: Feb. 22, 2005

(54) STACKABLE VERTICAL AXIS WINDMILL

(76) Inventor: Lewis H. Miller, Rte. 4. Box 594, Chandler, OK (US) 74834-8614

( * ) Notice: Subject to any disclaimer, the term of this patent is extended or adjusted under 35 U.S.C. 154(b) by 271 days.

(21) Appl. No.: 10/064,180

(22) Filed: Jun. 19, 2002

(65) Prior Publication Data

US 2003/0059306 A1 Mar. 27, 2003

Related U.S. Application Data

(60) Provisional application No. 60/299,383, filed on Jun. 19, 2001.

(51) Int. Cl.[7] .............................................. F03D 3/04
(52) U.S. Cl. ............................ 415/4.2; 415/42; 415/45; 415/18; 416/32; 416/37; 416/41; 416/47; 416/132 B; 416/169 R; 416/198 R; 416/198 A; 416/244 R; 416/244 A; 416/DIG. 6
(58) Field of Search .......................... 415/4.2, 4.4, 907, 415/36, 42, 43, 45, 18; 416/32, 37, 41, 44, 47, DIG. 6, 132 B, 169 R, 198 R, 198 A, 244 R, 244 A

(56) References Cited

U.S. PATENT DOCUMENTS

| | | | | | |
|---|---|---|---|---|---|
| 1,441,774 | A | * | 1/1923 | Adams ........................ | 415/4.2 |
| 4,115,027 | A | * | 9/1978 | Thomas ....................... | 415/4.4 |
| 4,134,707 | A | * | 1/1979 | Ewers ......................... | 415/4.2 |
| 4,134,708 | A | * | 1/1979 | Brauser et al. ......... | 416/132 B |
| 4,245,958 | A | * | 1/1981 | Ewers ......................... | 415/907 |
| 4,449,053 | A | * | 5/1984 | Kutcher .................. | 416/132 B |
| 4,486,143 | A | * | 12/1984 | McVey ........................ | 415/907 |
| 4,490,093 | A | * | 12/1984 | Chertok et al. ............... | 416/32 |
| 4,565,929 | A | * | 1/1986 | Baskin et al. ................. | 416/32 |
| 4,589,820 | A | * | 5/1986 | Butler, Jr. .................... | 415/907 |
| 4,692,095 | A | * | 9/1987 | Lawson-Tancred .......... | 416/32 |
| 4,776,762 | A | * | 10/1988 | Blowers, Sr. ................ | 416/44 |
| 5,525,037 | A | * | 6/1996 | Cummings ............. | 416/132 B |
| 6,179,563 | B1 | * | 1/2001 | Minchey ..................... | 415/4.2 |
| 6,242,818 | B1 | * | 6/2001 | Smedley ...................... | 290/44 |
| 6,413,038 | B1 | * | 7/2002 | Lord .......................... | 415/4.2 |

FOREIGN PATENT DOCUMENTS

| | | | | | |
|---|---|---|---|---|---|
| GB | 2199-377 A | * | 7/1988 | ................. | 415/4.2 |
| JP | 60-45787 A | * | 3/1985 | .................. | 416/32 |

* cited by examiner

Primary Examiner—Christopher Verdier
(74) Attorney, Agent, or Firm—Martin S. High

(57) ABSTRACT

A stackable, vertical axis windmill comprised of a braced external frame that enables stacking of multiple windmill assemblies. Couplings are located on both ends of the vertical rotor shaft to enable stacking and the transmission of power, an internal wind flow cavity, and controlled wind guides is described. The external frame includes structural bracing that allows for two or more windmill to be stacked one upon another to optimize the use of land or rooftop space for the generation of electricity from wind power. The computer controlled wind guides automatically close partially in high wind conditions in order to prevent damage to the windmill. The internal wind flow cavity allows wind to transfer power to both the windward and leeward rotors blades. The rotor axis is constructed so that all bearings can be replaced without dismantling the structure.

2 Claims, 10 Drawing Sheets

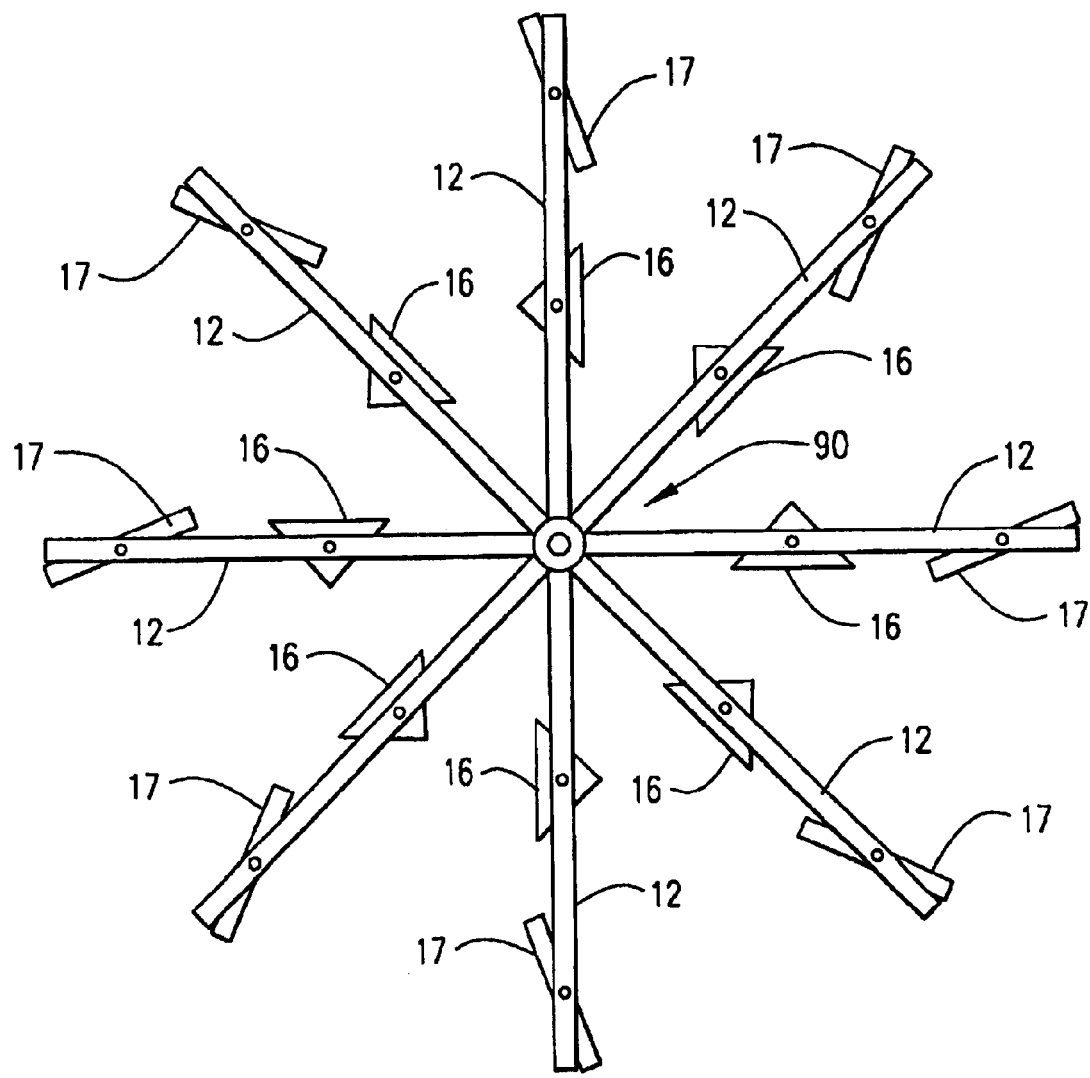
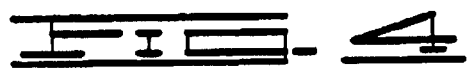

STACKABLE VERTICAL AXIS WINDMILL

CROSS REFERENCE TO RELATED APPLICATIONS

This invention claims benefit of U.S. Provisional Application No. 60/299,383, which was filed on Jun. 19, 2001.

BACKGROUND OF INVENTION

Our society continues to look for alternate methods of electricity generation that are economical and environmentally friendly. While it is clear that the traditional power generation methods such as fossil fuel combustion and nuclear power generation will be used for decades if not generations to come, other sources of power generation will contribute much more as the costs of the traditional methods increase. Furthermore, the environmental costs of the continued use of power generation facilities that use nonrenewable resources continue to become apparent to our society. Therefore, technological advances using renewable energy sources are going to be extremely important in the future. Wind power is one renewable energy source that is particularly important to rural locations.

Generation of electricity continues to improve and will increase in importance to the overall energy future of our society. Correspondingly, electrical energy consumption will increase as our population and economy continues to grow. Wind power is particularly important for rural locations where electrical power is not as plentiful and reliable as in more urban locations. Furthermore, rural locations are particularly well suited to wind power since the land costs associated with wind power generation reduces the overall cost. Conversely, urban locations are continuing to struggle with power reliability due to deregulation. Low land use and scaleable wind generation would be helpful in urban locations especially if environmental concerns are paramount. If a reliable and scalable wind power generation system was available such a system could find a useful niche in both rural and urban markets. The purpose of the instant invention is to meet these needs by providing a cost effective, scalable wind power generation system.

The field of the instant invention is the generation of power using the motion of atmospheric wind. More specifically, the instant application teaches how to generate power from wind using a stackable, vertical axis windmill comprised of a braced external frame, rotors, internal bracing within rotor sections, bracing between rotor sections to increase the structural integrity of the complete multi-unit structure, an internal wind flow cavity, and controlled wind guides to increase the efficiency and protect the windmill in high velocity and gusty winds.

Description of the Related Art Including Information Disclosed Under 37 CFR 7.97 and 1.98

As one would expect, the art in the area of windmills is plentiful. In the discussion that follows, the advantages and improvements of the various teachings of the prior art are summarized. Windmill design has progressed for hundreds of years. Various shapes and orientations have been studied including those with horizontal and vertical axis. Two basic types of windmill blades have been invented: drag-type blades and aerodynamic-type blades. The drag-type blades rely on the drag of the moving wind over the blades for transferring the kinetic energy from the wind to the blade, whereas the aerodynamic-type blades take advantage of the wind foil shape of the blade to provide motion. Both types of blades have advantages and disadvantages that have been discussed in the literature.

A representative example of the art is U.S. Pat. No. 4,115,027 ("027) by Thomas that teaches a vertical windmill with airfoils mounted around a vertical axis. The support frame allows the airfoils to rotate around the central axis thereby generating the torque required to power an electrical generator. Attached to the support frame are stators that direct the wind to the airfoil blades. The unit is self-supported, but "027 does not teach how to expand the power production from this single unit.

Ewers in U.S. Pat. No. 4,134,707 ("707) teaches a vertical axis windmill with a segmented design that can be incrementally added to increase the power production of the overall unit. Patent "707 uses a vertically rising exoskeleton with four external standards and at least two vertically spaced sets of radially converging ribs. The rotor in "707 is saw-toothed shaped to capture the movement of the wind. Although not claimed in "707 the specification teaches that the exoskeleton is to be braced with external guide wires. External guide wires are troublesome when attempting to implement the wind power unit in confined areas or where the added land requirements make the guide wires unworkable or unsightly.

U.S. Pat. No. 5,910,688 by Li teaches an improvement to the traditional farm windmill that is commonly seen in the countryside in the United States. More advanced technology is commonly found in the art as well, such as taught in U.S. Pat. No. 5,506,453 by McCombs. McCombs teaches a more modern version of the traditional farm windmill and includes a dual rotor, single support system. Both the Li and McCombs patent teach horizontal axis windmills. The term horizontal axis means that the wind causes a shaft to turn to transmit power, and the shaft is parallel with the wind, or horizontal to the ground. The most significant disadvantage with horizontal axis windmills is that they are very difficult to scale, that is to increase in generation capacity. To increase the energy producing power of horizontal windmills additional windmills must be added adjacent to the location of the existing windmills that will increase the amount of land used thereby increasing the cost.

An alternative to the technology taught by Li and McCombs are vertical axis windmills. U.S. Pat. No. 4,776,762 by Blowers is a representative technology for vertical axis windmills. Blowers teaches a power conversion turbine with a plurality of moveable blades. These blades open and close as the turbine rotates around its axis so as to make the best use of the wind. A single axis supports the turbine. In the configuration taught by Blowers, the turbine could be oriented so that the axis of rotation is vertical. In this way, the Blowers technology is scaleable by stacking several turbines vertically on the same axis.

Previous art that relates most closely to the instant invention is U.S. Pat. No. 6,242,818 ("818) by Smedley. Smedley teaches a vertical axis wind turbine having a plurality of blades around a vertical axis. The blades contain a wind catching surface and doors that open or close depending on the speed of the wind. The doors are inclined and are mounted on a pivot axis. As the windmill rotates at a higher velocity, the doors are forced outward thereby reducing the wind catching capability of the wind catching surface. In this manner, the "818 device is self-regulating. As the wind velocity increases past a critical velocity, the doors close to govern the rotational velocity of the windmill. Blowers also teaches the scalability of the device by stacking turbines vertically on the axis. The vertical axis is the only structural support of the device taught by Blowers.

The previous art suffers from several drawbacks. First, windmills that rely on horizontal axis turbines require additional land for scalability and additional machinery for transmitting the power from a horizontal axis to the ground for electricity generation.

Second, the vertical axis windmills that rely on the rotor axis for structural support are not strong enough for the high velocity or gusty wind conditions common in many parts of the world. The instant invention addresses all of the disadvantages of the prior art by using a vertical shaft for transmission of power and an external frame to support the windmill.

The external frame is particularly important since this allows for the increased structural support of the windmill when two or more windmills are stacked. Stacking allows for more efficient use of costly land or rooftops. The external frame increases the overall strength of the windmill in contrast to the single member support, the power axis, used in prior devices.

SUMMARY OF INVENTION

The instant invention is a free standing, scaleable, vertical axis windmill comprised of a braced external frame to enable stacking, rotors, couplings on both ends of the vertical rotor shaft to enable stacking and the transmission of power, an internal wind flow cavity, and controlled wind guides to increase the efficiency and protect the windmill in high velocity and gusty winds. An RPM sensor is included to partially close the external doors during high winds

BRIEF DESCRIPTION OF DRAWINGS

These and other—attributes of the instant invention will become more clear upon thorough examination and study of the description of the best mode of carrying out the invention. The study of the description is particularly illuminating when done in conjunction with the drawings, wherein.

FIG. 4 provides a top view of a rotor assembly showing the top rotor flange assembly, horizontal braces, inside rotor blades, and outside rotor blades. The horizontal cable bracing that would normally be provided around the outside edge of the horizontal braces is not shown.

DETAILED DESCRIPTION

The instant invention 1 is comprised of a frame structure, rotor assembly 9, and a plurality of wind guides 34. Multiple instances of the instant invention can be stacked one upon the other to form a composite structure of up to 500 feet to harness the power of the moving wind. The description of the instant invention to follow will first focus on one instance of the invention and then later describe how multiple instances can be combined to form a larger structure capable of generating additional power.

Figure 1:
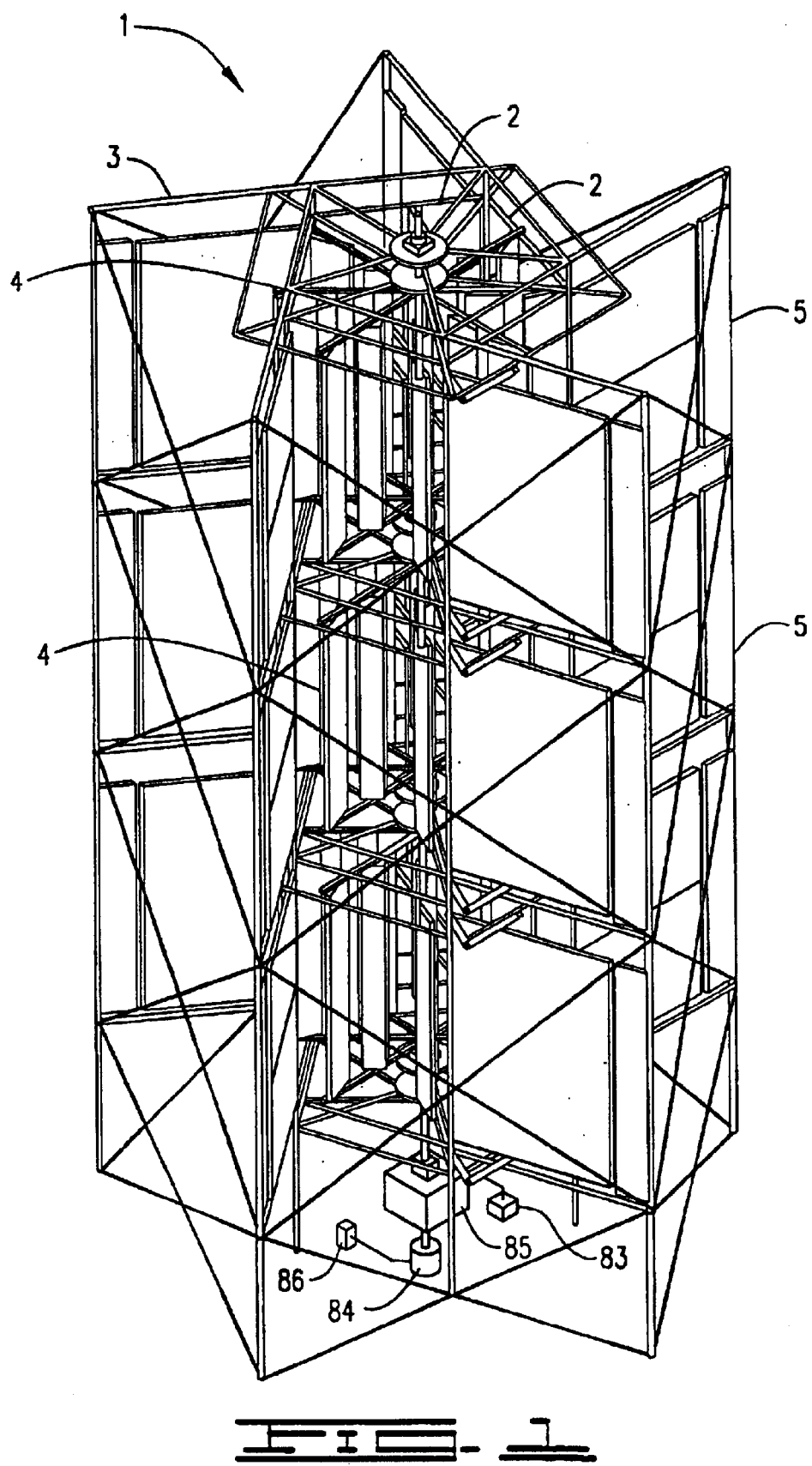
FIG. 1 provides a three dimensional perspective of a complete, stacked, multi-unit vertical axis windmill showing the frame assemblies, rotor assemblies and wind guide assemblies.

The frame structure as illustrated in FIG. 1 is comprised of a plurality of inside horizontal members 2, a plurality of outside horizontal members 3, a plurality of inside vertical members 4, and a plurality of outside vertical members 5. The plurality of inside horizontal members 2, the plurality of outside horizontal members 3, the plurality of inside vertical members 4, and the plurality of outside vertical members 5 can be fabricated from wood, aluminum, composite materials, but most commonly are fabricated from steel. The plurality of inside horizontal members 2 radiate outward from a frame flange at the top and bottom of the frame. The rotor axis 10 is rotatably mounted inside the frame flange.

Figure 2:
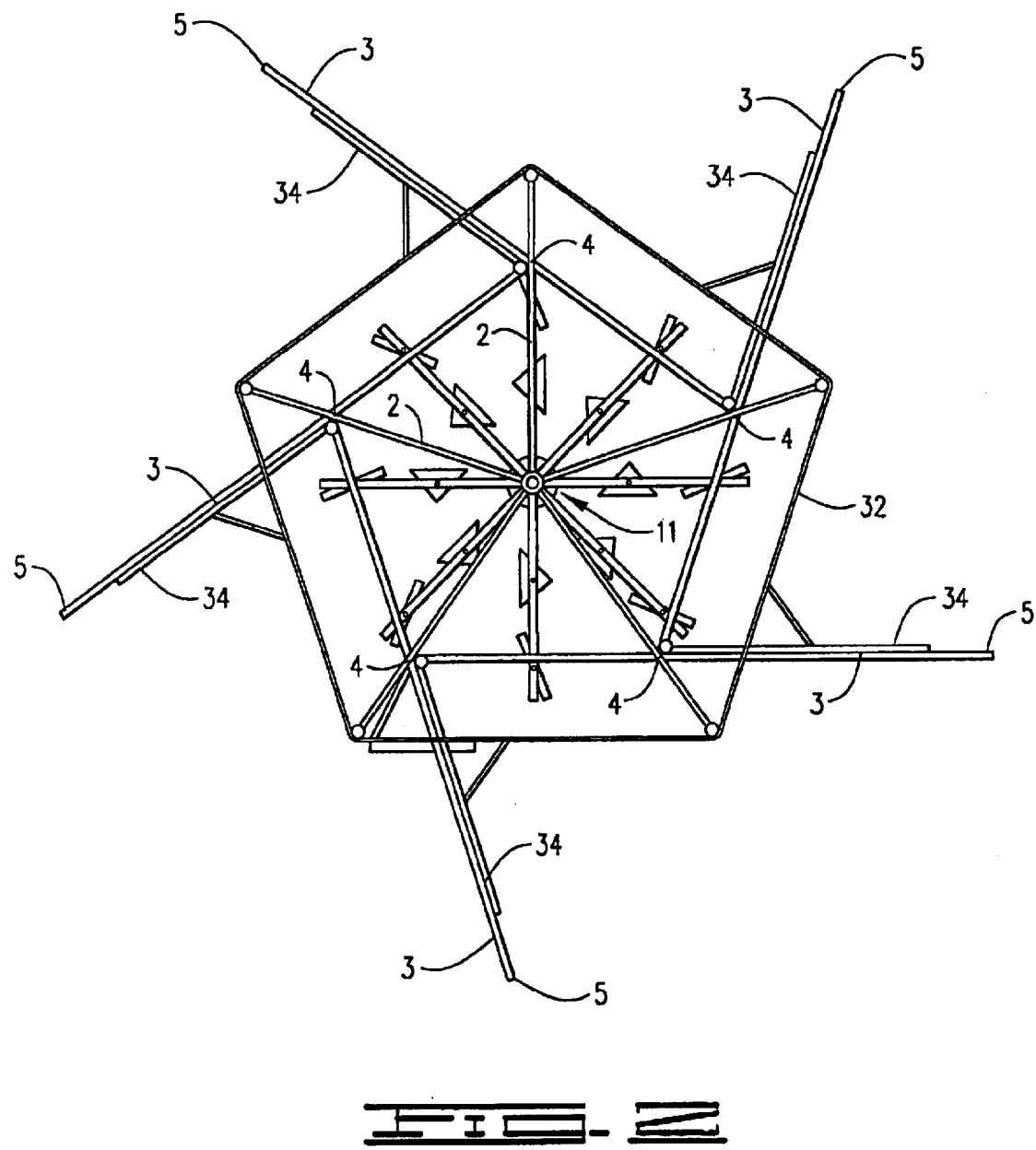
FIG. 2 shows a top view of the vertical axis windmill showing the relationship among the rotor shaft, the wind guides, and the rotor blades, and frame assembly.

As shown in the top view of the instant invention in FIG. 2, the plurality of inside horizontal members 2 radiate outward from the top rotor flange assembly and are rigidly attached to the plurality of inside vertical members 4. The plurality of inside horizontal members 2 are rigidly attached to the top rotor flange by a welded connection or threaded connectors in concert with a key to prevent the independent rotation of the rotor axis and the rotor assembly. The top rotor flange is located below the top frame flange 11 along the rotor axis. The rigid attachment of the inside horizontal members 2 and the inside vertical members 4 can be accomplished using threaded connectors, but is most commonly accomplished via welded joints. The inside vertical members 4 are placed equidistant from the rotor axis 10 outside the circumference of the rotor assembly 9. The outside vertical members 5 are placed equidistant from the rotor axis 10 at a distance approximately twice the diameter of the rotor assembly 9. The inside vertical members 4, the outside horizontal members 3, and outside vertical members 5 serve to provide support and stability for the entire structure and can be two or more in number depending on the size of windmill and the amount of stability required due to wind conditions.

Figure 3:
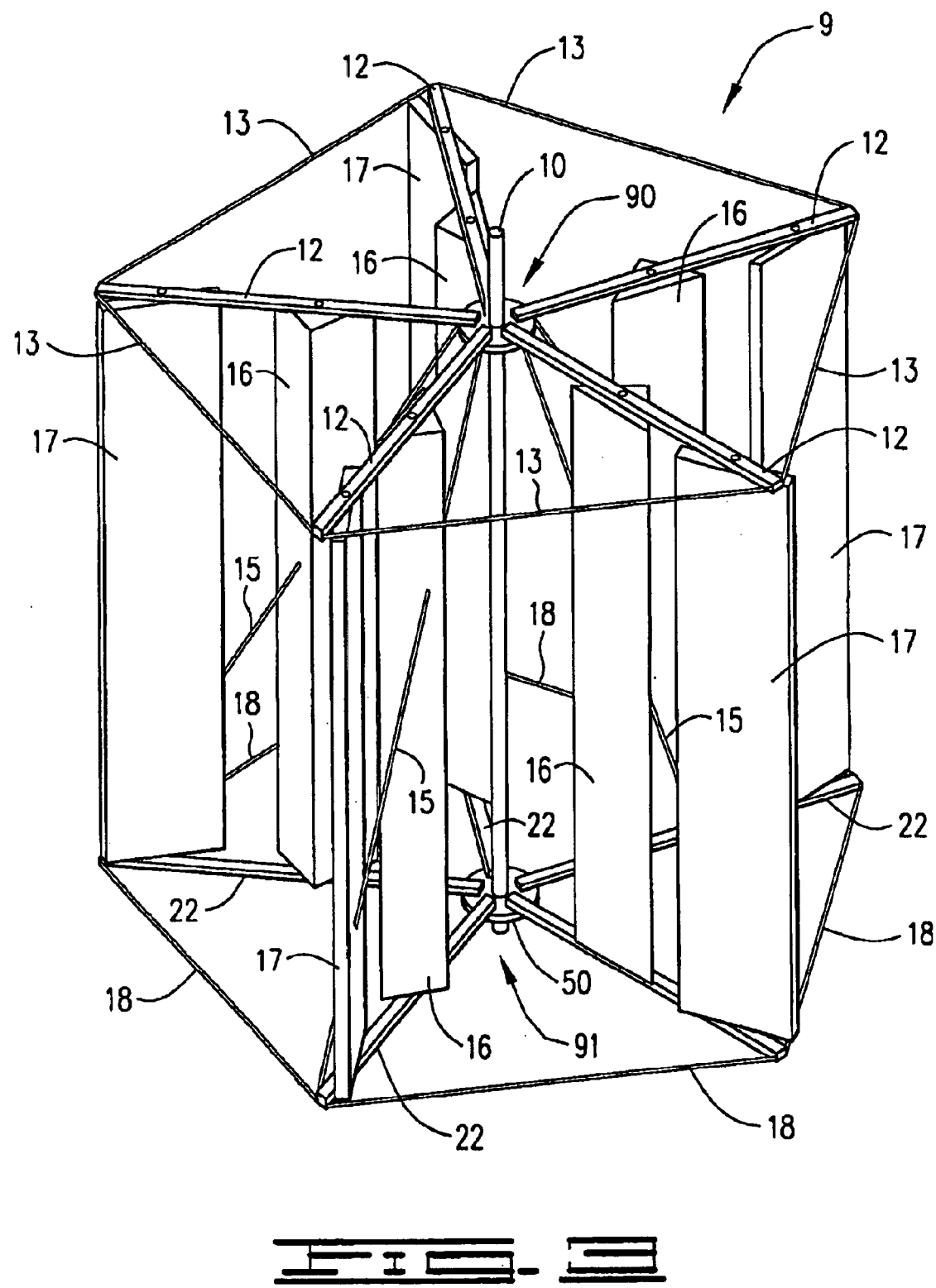
FIG. 3 shows is a three dimensional perspective of the rotor assembly with the rotor blades, and the rotor shaft.

The rotor assembly 9 is shown in perspective in FIG. 3 and is comprised of a rotor axis 10, a top rotor flange assembly 90, a bottom rotor flange assembly 91, a plurality of top horizontal rotor braces 12, a plurality of bottom horizontal rotor braces 22, a plurality of inside rotor blades 16, a plurality of outside rotor blades 17, a top horizontal bracing cable 13, a bottom horizontal bracing cable 18, and a plurality of diagonal bracing cables 15. The rotor assembly 9 is located within the frame structure described above. More precisely, the rotor assembly 9 is axisymmetrically located within the frame structure with the rotor axis 10 aligned with the center of the frame structure.

The plurality of inside rotor blades 16 and plurality of outside rotor blades 17 are attached via threaded or welded connections to the plurality of top horizontal rotor braces 12 and to the plurality of bottom horizontal rotor braces 22. The plurality of top horizontal rotor braces 12 radiate outward from the top rotor flange assembly 90. The inside ends of the top horizontal rotor braces 12 connect via threaded or welded connections to the top rotor flange assembly 90. The outside ends of the plurality of top horizontal rotor braces 12 are equally spaced around the outer circumference of the rotor assembly 9. The inside ends of the bottom horizontal rotor braces 22 connect via threaded or welded connections to the bottom rotor flange assembly 91. The outside ends of the plurality of bottom horizontal rotor braces 22 are equally spaced around the outer circumference of the rotor assembly 9. The plurality of inside rotor blades 16 are set at an angle between 15 degrees and 45 degrees incident with each corresponding top horizontal rotor brace 12 and to the plurality of bottom horizontal rotor braces 22. The plurality of outside rotor blades 17 are set at an angle between 10 degrees and 45 degrees incident with each corresponding top horizontal rotor brace 12 and to the plurality of bottom horizontal rotor braces 22.

The rotor assembly 9 is internally braced with a top horizontal bracing cable 13, a bottom horizontal bracing cable 18, and a plurality of diagonal bracing cables 15. These bracing cables allow for the rotor assembly to be self-contained and to distribute the weight of the entire rotor assembly 9 onto the rotor axis 10.

Figure 5:
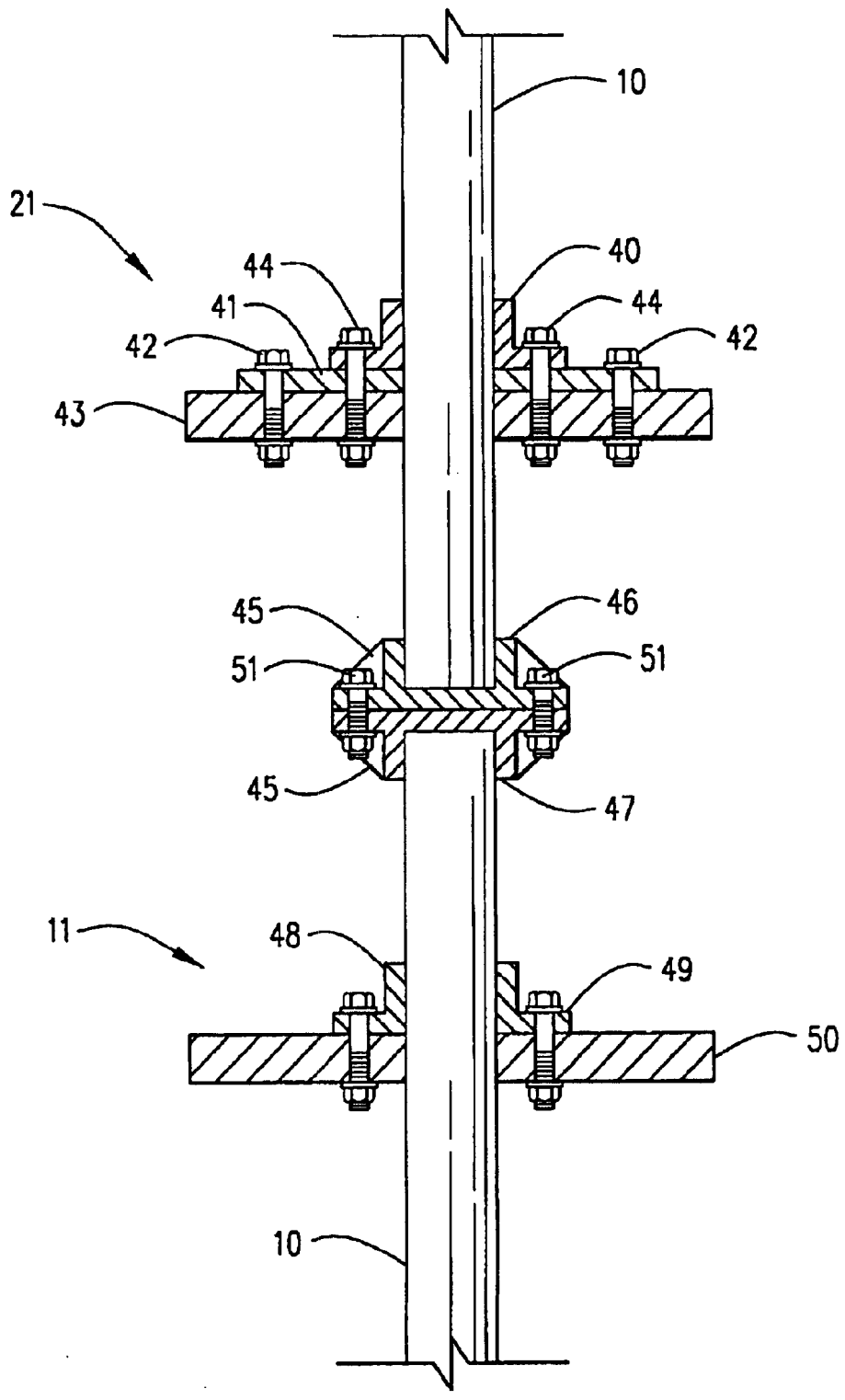
FIG. 5 shows how the rotor axes can be connected to form a stacked, multi-unit structure. The top frame flange assembly, coupling, and bottom frame flange assembly are shown.
Figure 6:
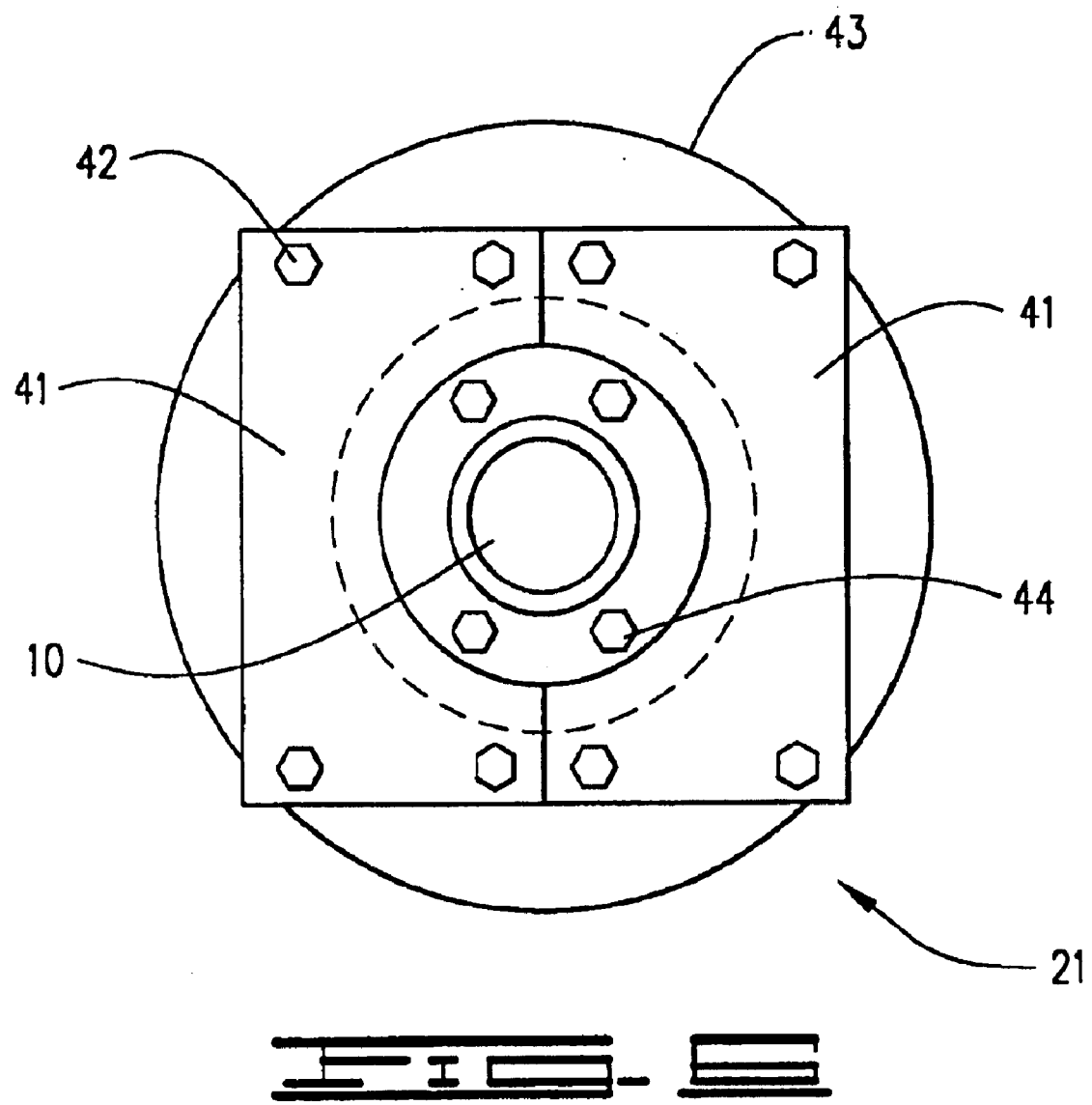
FIG. 6 is a top view of a bottom frame flange assembly showing the flange, split plate, and bearing. The split plate can be removed allowing the bottom bearing to be removed by passing the bearing downward through the bottom frame flange and off of the rotor axis.

The top frame flange assembly 11 is shown in more detail in FIG. 5 and is shown how two rotor assemblies 9 can be combined at the rotor axis 10. The rotor axis 10 of a given rotor assembly 9 passes through a top frame flange assembly 11. The top frame flange assembly 11 is comprised of a top flange plate 50 which is attached via a plurality of top flange bolts 49 to a top flange bearing 48. The rotor axis 10 is terminated with a top coupling 47 which is attached via a weld to the top of the rotor axis 10. A corresponding rotor axis 10 for the rotor assembly 9 to be installed on top of the first rotor assembly 9 is terminated on the bottom with a bottom coupling 46 which is attached via a weld to the bottom of the rotor axis 10. Two rotor assemblies 9 are connected by attaching the top of one rotor axis 10 with the bottom of another rotor axis 10 and securing the connection with a plurality of coupling bolts 51. To prevent the two rotor assembly from rotating independently, the top coupling 47 and bottom coupling 46 are fitted with a key 45 to force the top coupling 47 and bottom coupling 46 to rotate with the rotor axis 10 at the same angular speed. The top rotor flange 90 and bottom rotor flange 91 are also keyed with the rotor axis to prevent the rotor from rotating independently from the rotor axis. However, the top coupling 47 and bottom coupling 46 that are placed between each rotor assembly provide some flexibility so that each rotor assembly can move independently to a small degree.

As is shown in FIG. 5, the bottom frame flange assembly 21 is comprised of a bottom flange 43, a split plate 41, and a bottom bearing 40. The bottom flange 43 is connected to the split plate 41 via a plurality of bottom flange bolts 42. The bottom bearing 40 is connected to the split plate 41 and the bottom flange 43 via a plurality of bottom bearing bolts 44. The split plate 41 allows for removal of the bottom bearing 40 without disassembly of multiple rotor assemblies 9. To replace a bottom bearing 40, the bottom bearing bolts 44 and bottom flange bolts 42 are removed. Then the coupling bolts 51 are removed and the bottom coupling 46 and key 45 are removed. Both portions of the split plate 47 can be then removed. Lastly, the bottom bearing 40 then can pass through the opening in the bottom flange 43 and off the bottom end of the rotor axis 10. A new bottom bearing 40 can then be installed by reversing the procedure outlined above. The ability to replace the bottom bearing without complete disassembly of the entire stack of windmill assemblies is a unique and attractive feature of the instant invention.

The top bearing 48 can also be removed using a similar procedure. The coupling bolts 51 are removed along with the top coupling 47 and key 45. Removing the top bearing bolts 49 allows the top bearing 48 to be removed.

When stacking additional entire assemblies of windmill one upon the other, the plurality of inside vertical members 4 and outside vertical members 5 can be connected via vertical support connectors 70 to provide the necessary support for the entire structure. These connections are accomplished through bolted vertical support connectors 70 so that windmill assemblies can be added or removed as necessary. If required, external guy wires can be employed to further steady the structure. Structures up to 500 feet can be created by stacking multiple windmill assemblies. A frame braced with internal cables only is capable of supporting a structure of up to 100 feet in height, but can be further supported by guide wires anchored to the ground.

Figure 7:
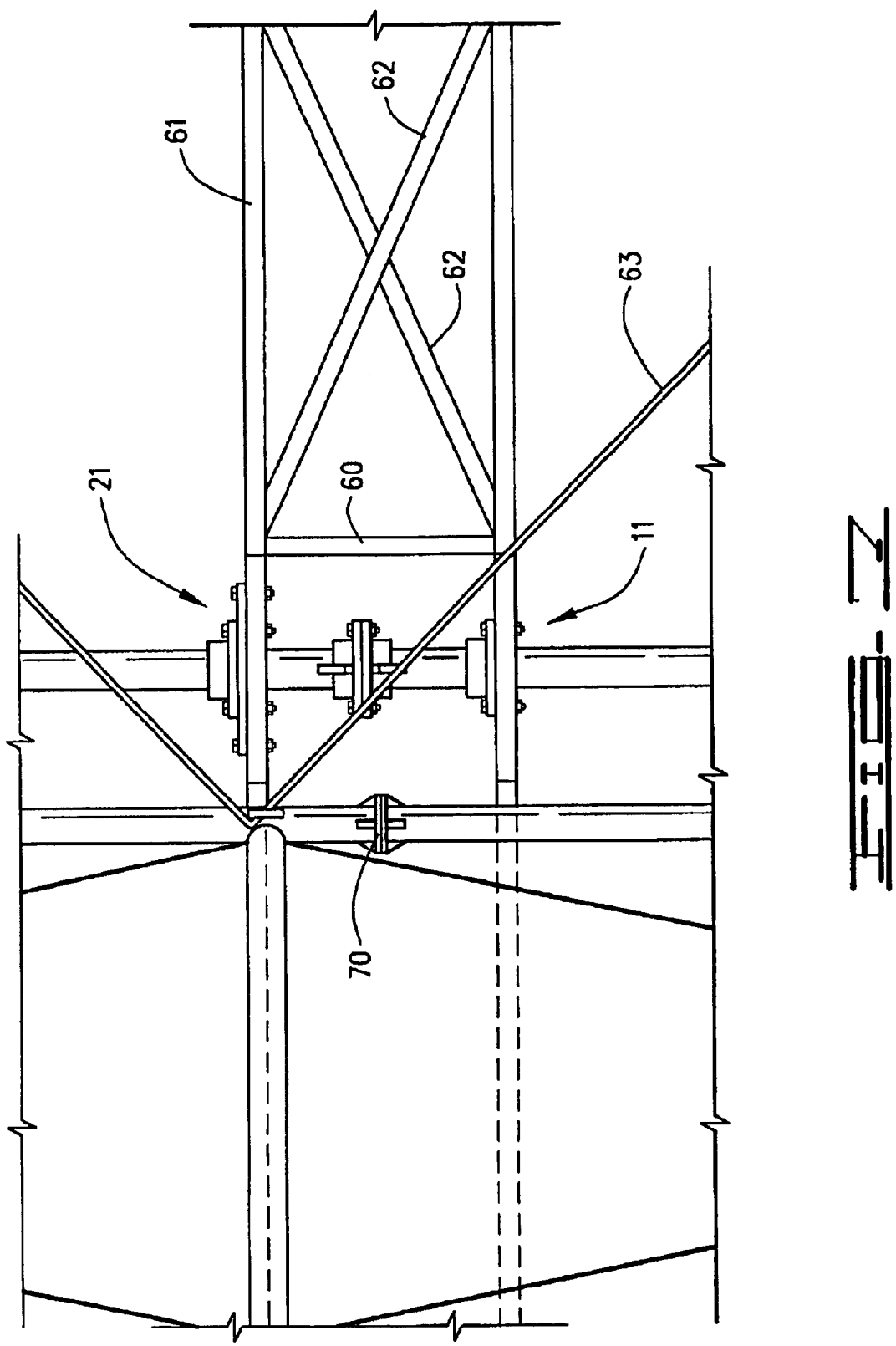
FIG. 7 is a view of the bracing between rotor assembly sections and showing the bottom frame flange assembly, coupling, and top frame flange assembly.

To further support the structure when multiple windmill assemblies are stacked, interstitial braces are employed as is shown in FIG. 7. Here interstitial cross braces 62, interstitial horizontal braces 61, and interstitial vertical braces 60 are used to add support. Further a lace-up cable 63 is provided to alternate between the outer vertical poles. Tension adjustment of the lace-up cable is provided at the base of the entire windmill structure.

Figure 8:
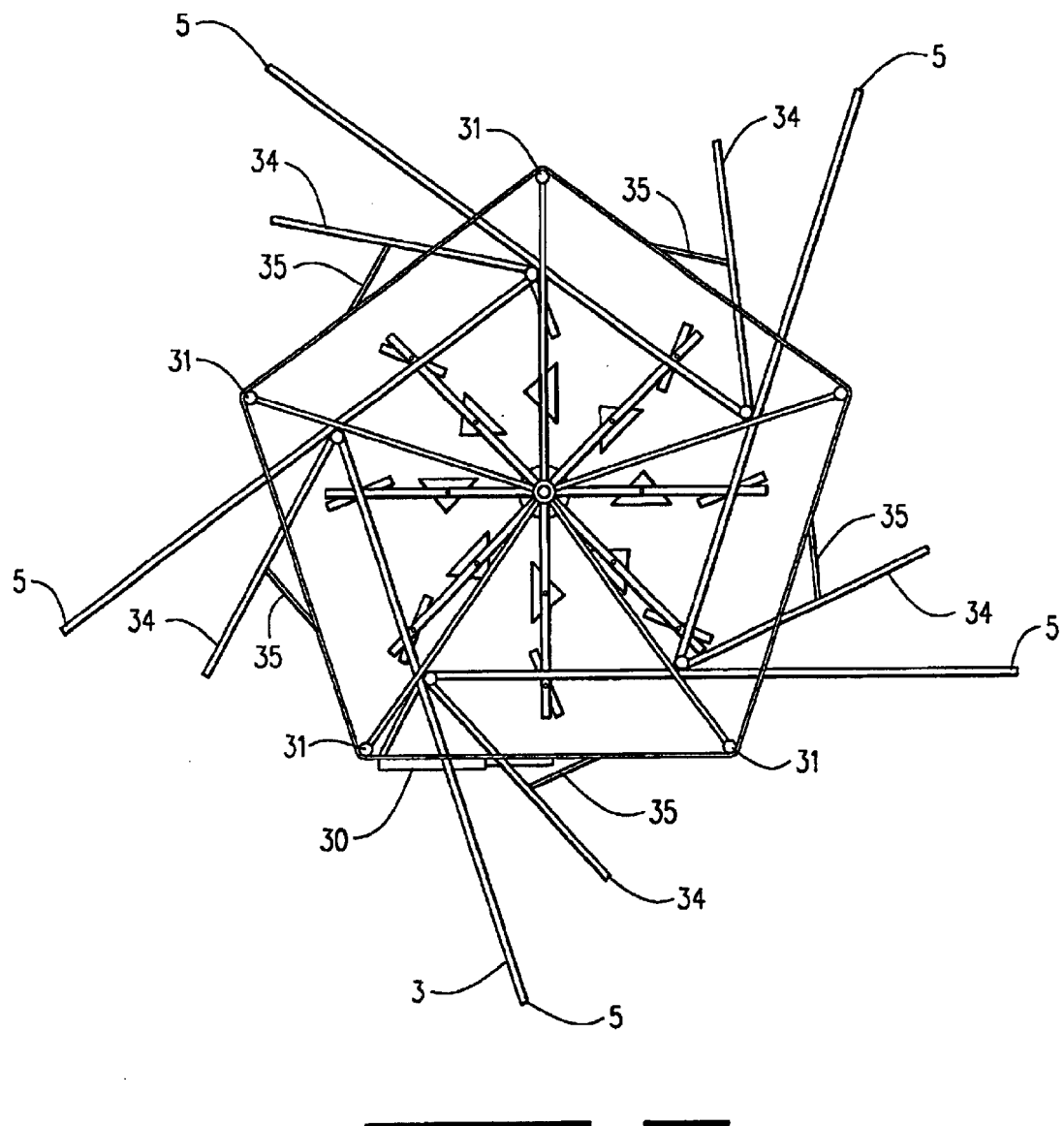
FIG. 8 is a top perspective of the vertical axis windmill showing the rotor assembly positioned inside the frame, the wind guides position toward the outer edge of the frame. The wind guides are in a partially closed position.
Figure 9:
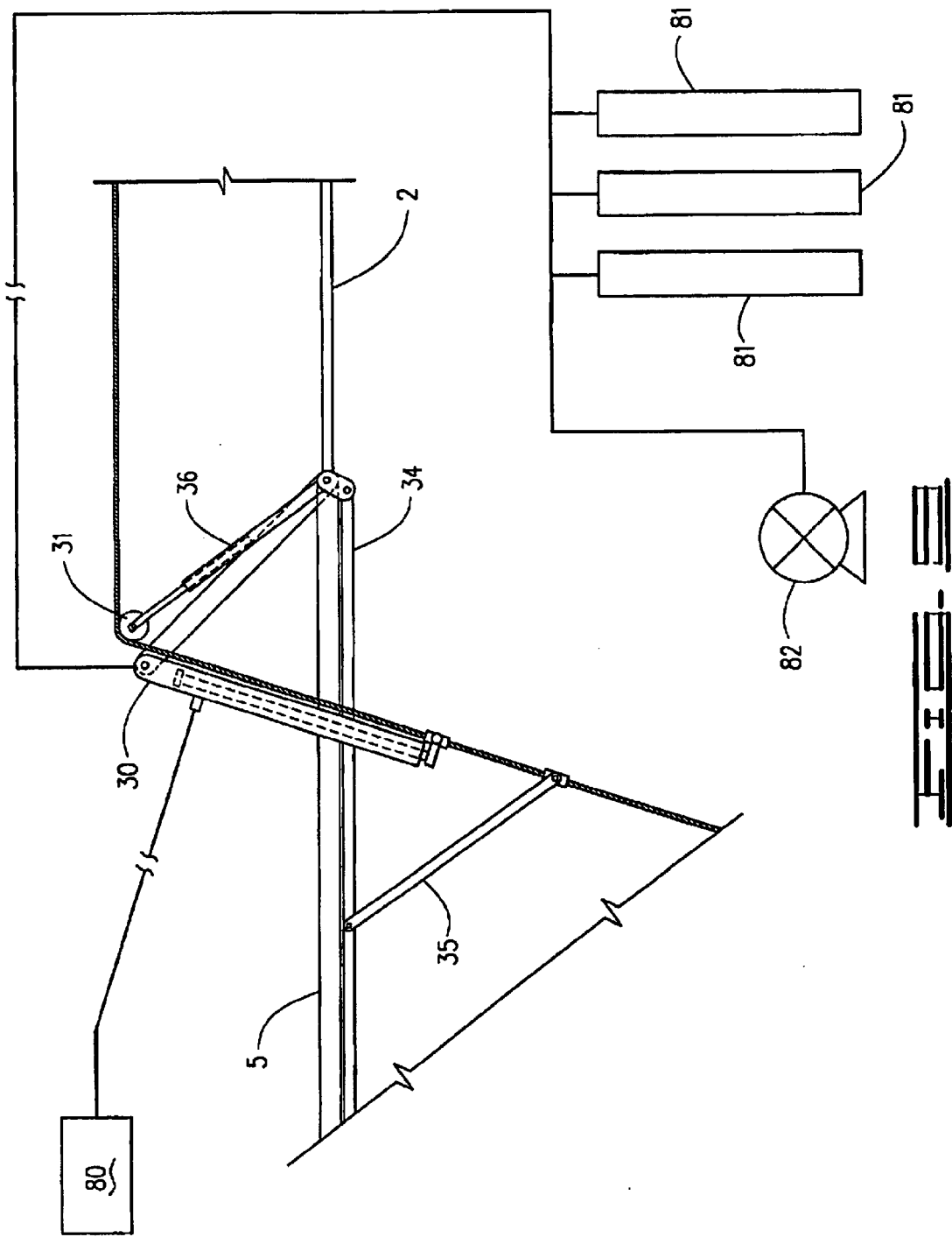
FIG. 9 shows the air cylinder assembly for opening and closing the wind guides.
Figure 10:
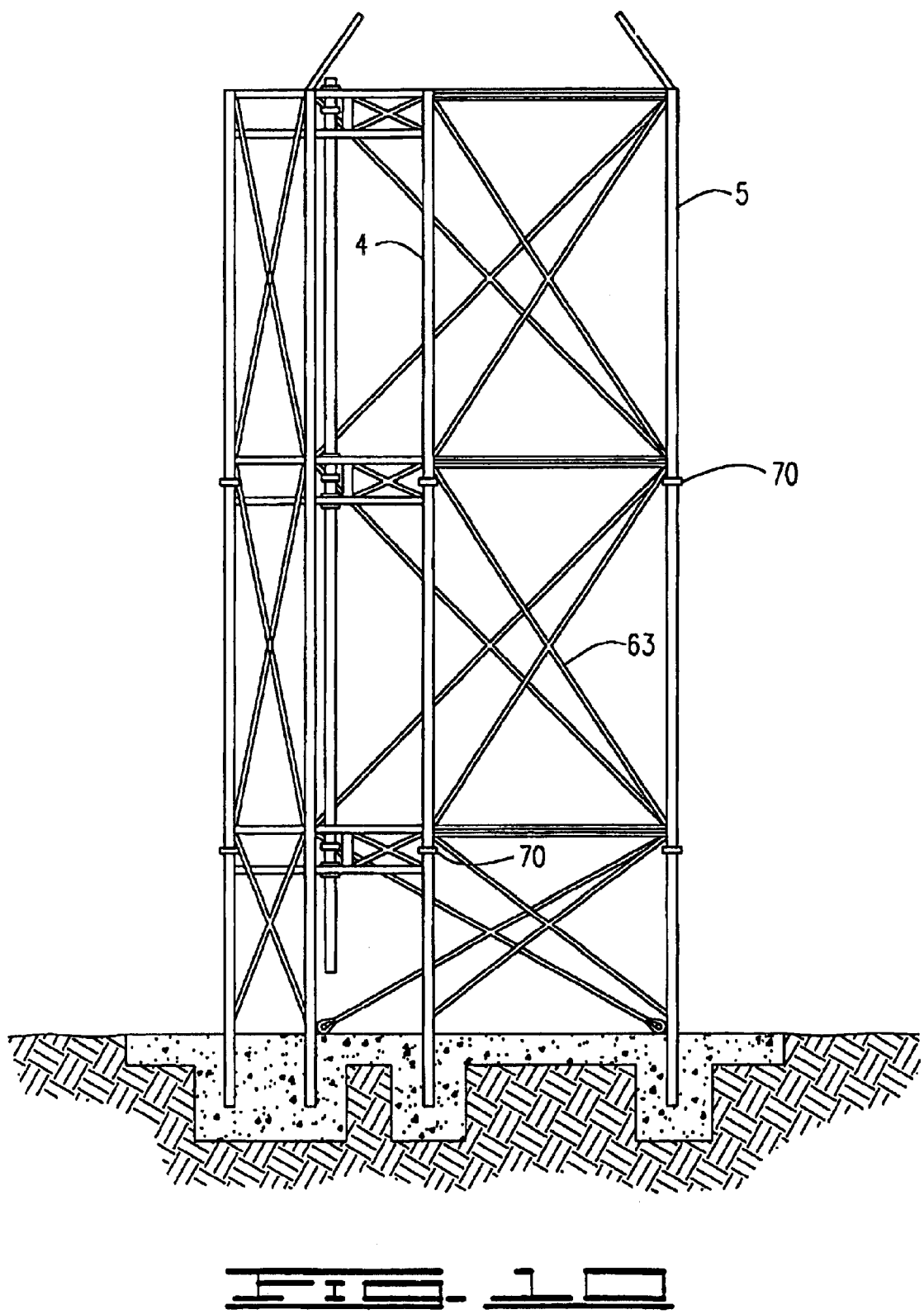
FIG. 10 is a side view of a mult-unit, stacked assembly showing the lacing cable support. The lacing cable support is attached to the foundation of the stacked assembly.

A plurality of wind guides 34 are used to funnel wind to the rotor assembly. The wind guides 34 in a open position are shown in FIG. 2 and in a closed position in FIG. 8. The wind guides are hingedly connected to the plurality of inside vertical members 4 and are held open to capture wind power. Depending on the wind conditions, as few as four and as many as ten wind guides can be employed. The wind guides are activated using a plurality of air cylinders 30 as shown in FIG. 9. The plurality of air cylinders 30 are connected to the plurality of wind guides 34 via a plurality of stiff arms 35 and wind guide cables 32. The tension in the wind guide cables 32 is controlled via wind guide cable tensioners 36 which are in turn connected to wind guide cable pulleys 31. To adjust the tension in the wind guide cables 32 the wind guide cable tensioners 36 are expanded or collapsed as necessary. The wind guide cables 32 are supported by the wind guide cable pulleys 31 and the wind guide cables 32 are threaded around the entire assembly as shown in FIG. 2 and FIG. 8. During normal wind conditions, the wind guides are in the fully open position to guide wind into the rotor assembly, but the wind guides can also be partially closed to moderate the amount of wind supplied to the rotor assembly under high wind conditions. The plurality of air cylinders 30 are operated by computer controlled pneumatic supply to automatically control the aperture of the wind guides based on the prevailing wind speeds. As tension is placed on the wind guide cables 32, the wind guides 34 open and close depending on the requirement for the aperture of the wind guides. The wind guides 34 provide three functions: 1) to direct wind to the rotors under normal conditions, 2) to shield the drag side of the rotors under normal wind conditions, and 3) to direct a portion of the wind through the structure bypassing the rotors in high wind conditions to prevent damage to the rotor assembly 9. The wind guides 34 are braced and hinged to the inside vertical members 4 for additional strength and durability.

In the operation of the windmill, the wind passes across the air catching surface of the plurality of inside rotor blades 6 and the plurality of outside rotor blades 17 and cause the rotors assembly 9 to turn. The rotor axis 70 in the rotor assembly 9 is then connected to an electrical generator to produce the electrical power. The shape of the inside rotor blades 16 and the outside rotor blades 17 can vary depending on wind condition, but are most commonly triangular, rectangular or airfoil shaped. The rotors are angled so the wind passing over the rotor provides some lift in the vertical direction both as the wind enters and exits the rotor assembly.

The best mode of operation for the vertical axis stackable windmill is for a single rotor assembly to be housed inside the external frame that in turn supports the wind guide assembly. Two or more of the windmills may be stacked and connected with a rotor coupling shown in FIG. 5. Under normal conditions the wind enters one side of the instant invention and causes the rotor assembly to turn. Power is transmitted through the rotor shaft to an electric generator or other device that uses the power generated by the windmill.

Under high wind conditions, the wind guides partially close to narrow the aperture available for the wind. With the wind guides closed, the windmill slows so as not to be damaged by the excessive rotational speeds developed by the high wind conditions. After the predetermined period of time, the wind guides reopen. If the wind velocity is sufficiently high to close the wind guides again, the wind guides will partially close again. If the wind velocity has lessened, the wind guides open and the windmill resumes production of power. An RPM (revolutions per minute) sensor is included that will allow the doors to close under high wind conditions and, if necessary, apply an air brake to the rotor shaft so that the rotors will while allowing the wind to move through the structure thereby precluding damage under high wind conditions.

The instant invention is further comprised of means for controlling the pneumatically driven cylinder assemblies based on wind conditions, an air brake to slow the rotor shaft under high wind conditions, means for controlling the air brake based on wind conditions and operational parameters, a tachometer to monitor the angular speed of the rotor shaft, an air compressor and an air tank to drive the plurality of pneumatically driven cylinder assemblies to open and close the wind guide doors, and a means for transferring the power of the rotating rotor shaft from the rotor shaft to an electrical generator.

What is claimed is:

1. A vertical axis wind power electrical generation device comprising:
   a vertically oriented rotor shaft;
   an upper rotor flange keyed to securely engage with the vertically oriented rotor shaft;
   a lower rotor flange keyed to securely engage with the vertically oriented rotor shaft;
   a plurality of vertically oriented inner rotor blades equally spaced at a constant radial distance around the vertically oriented rotor shaft;
   a plurality of vertically oriented outer rotor blades equally spaced at a constant radial distance around the vertically oriented rotor shaft;
   a plurality of top horizontal rotor braces radiating outward from the upper rotor flange which are connected to both the top of the plurality of vertically oriented inner rotor blades and the top of the plurality of vertically oriented outer rotor blades;
   a plurality of bottom horizontal rotor braces radiating outward from the lower rotor flange which are connected to both the bottom of the plurality of vertically oriented inner rotor blades and the bottom of the plurality of vertically oriented outer rotor blades;
   a plurality of horizontally oriented members that radiate outward from a frame flange at the top and bottom of a frame;
   a plurality of vertically oriented inner support poles equally spaced at constant radius around the vertically oriented rotor shaft;
   a plurality of vertically oriented outer support poles equally spaced at constant radius around the vertically oriented rotor shaft;
   a plurality of vertically oriented wind guides with inner edges hingedly connected to the vertically oriented inner support poles;
   a pulley assembly attached to each inner support pole;
   a wind guide cable located around the periphery of the inside vertical support poles and threaded through the pulley assembly provided on each inner support pole;
   a plurality of pneumatically driven cylinder assemblies to open and close the wind guides via action of the wind guide cable;
   means for controlling the pneumatically driven cylinder assemblies based on wind conditions;
   an air brake to slow the rotor shaft under high wind conditions;
   means for controlling the air brake based on wind conditions and operational parameters;
   a tachometer to monitor the angular speed of the rotor shaft;
   an air compressor and an air tank to drive the plurality of pneumatically driven cylinder assemblies to open and close the wind guide doors;
   a system of interconnections whereby additional windmill assemblies can be vertically stacked to provide additional wind power electrical generation capability;
   a lace-up cable provided around the plurality of vertically oriented outer support poles that is connected to a foundation to provide structural integrity and support for the frame;
   a top horizontal bracing cable;
   a bottom horizontal bracing cable;
   and a plurality of diagonal bracing cables to provide support for the rotor;
   a means for transferring the power of the rotating rotor shaft from the rotor shaft to an electrical generator.

2. The vertical axis wind power electrical generation device of claim 1 wherein the system of interconnections is comprised of:
   a flex coupling that connects a lower rotor shaft with an upper rotor shaft of a windmill assembly stacked vertically thereon;
   a rigid bracing system between multiple instances of stacked sections of the vertical axis wind power device.

* * * * *